US008271463B2

(12) United States Patent
Fish et al.

(10) Patent No.: US 8,271,463 B2
(45) Date of Patent: *Sep. 18, 2012

(54) SYSTEM AND METHOD FOR PROVIDING ACCESS TO DATA WITH USER DEFINED TABLE FUNCTIONS

(75) Inventors: Douglas R. Fish, Rochester, MN (US); Hoa T. Tran, Rochester, MN (US); David A. Wall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1954 days.

This patent is subject to a terminal disclaimer.

(21) Appl. No.: 11/023,678

(22) Filed: Dec. 28, 2004

(65) Prior Publication Data

US 2006/0143167 A1 Jun. 29, 2006

(51) Int. Cl.
*G06F 7/00* (2006.01)
*G06F 17/00* (2006.01)
(52) U.S. Cl. ............... 707/702; 707/769; 707/E17.014; 707/E17.069
(58) Field of Classification Search ............. 707/3–4, 707/100–102, 104.1, 702, 769, E17.069, 707/E1.014, 763
See application file for complete search history.

(56) References Cited

U.S. PATENT DOCUMENTS

| | | | |
|---|---|---|---|
| 6,021,410 A * | 2/2000 | Choy | 707/999.01 |
| 6,366,934 B1 * | 4/2002 | Cheng et al. | 707/999.2 |
| 6,466,934 B2 * | 10/2002 | Seese et al. | 707/703 |
| 6,519,597 B1 * | 2/2003 | Cheng et al. | 707/999.01 |
| 6,564,203 B1 * | 5/2003 | Krishnaprasad et al. | 707/702 |
| 6,938,044 B1 * | 8/2005 | Milby | 707/100 |
| 8,090,942 B2 * | 1/2012 | Peterson | 713/165 |
| 2004/0059706 A1 * | 3/2004 | Abelite | 707/1 |
| 2004/0267766 A1 * | 12/2004 | Marek et al. | 707/100 |
| 2005/0177570 A1 * | 8/2005 | Dutta et al. | 707/9 |
| 2005/0210023 A1 * | 9/2005 | Barrera et al. | 707/5 |
| 2005/0283465 A1 * | 12/2005 | Dettinger et al. | 707/3 |
| 2006/0080289 A1 * | 4/2006 | Brunswig et al. | 707/3 |
| 2006/0167850 A1 * | 7/2006 | Fish et al. | 707/3 |
| 2010/0332526 A1 * | 12/2010 | Nori et al. | 707/769 |

OTHER PUBLICATIONS

Laura M. Haas, J.C. Freytag, G.M. Lohman, and H. Pirahesh—IBM Almaden Research Center, San Jose, CA 95120—"Extensible Query Processing in Starburst"—Proceeding SIGMOD '89 Proceedings of the 1989 ACM SIGMOD international conference on Management of data—vol. 18 Issue 2, Jun. 1989 (pp. 377-388).*
Klaudia Hergula and The0 Harder—"A Middleware Approach for Combining Heterogeneous Data Sources—Integration of Generic Query and Predefined Function Access"—Web Information Systems Engineering, 2000. Proceedings of the First International Conference on—vol. 1, June 19-21, 2000 (pp. 26-33:1-8).*
U.S. Appl. No. 11/044,747, filed Jan. 27, 2005, entitled "System and Method for Providing Secure Access to Data With User Defined Table Functions".

* cited by examiner

*Primary Examiner* — John E Breene
*Assistant Examiner* — Anh Ly
(74) *Attorney, Agent, or Firm* — Patterson & Sheridan LLP

(57) ABSTRACT

Methods, systems and articles of manufacture are provided for accessing data within data repositories. Public UDTFs, private UDTFs and a metadata processor are utilized to provide access to data residing in a variety of data repositories.

6 Claims, 4 Drawing Sheets

SYSTEM AND METHOD FOR PROVIDING ACCESS TO DATA WITH USER DEFINED TABLE FUNCTIONS

BACKGROUND OF THE INVENTION

1. Field of the Invention

The present invention generally relates to data processing and more particularly to accessing data in data repositories with a system comprising user defined table functions (UDTFs) and a metadata processor.

2. Description of the Related Art

Data repositories are subject oriented, integrated, time-variant collections of relatively large volumes of transactional and archived data that facilitate decision support services. Data repositories are often implemented as databases that are managed by database management systems. Databases are computerized information storage and retrieval systems. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Data repositories may also be implemented as simply a collection of text files that are formatted according to a particular protocol. Alternatively, data repositories may also be implemented as XML based databases.

A relational database management system (RDBMS) is a database management system that manages relational databases and is capable of storing and retrieving large volumes of data. Further, large scale relational database management systems can be implemented to support thousands of users accessing databases via a wide assortment of applications. An RDBMS can be structured to support a variety of different types of operations for a requesting entity (e.g., an application, the operating system or an end user). Such operations can be configured to retrieve, add, modify and delete data being stored and managed by the RDBMS. Standard database access methods support these operations using high-level query languages, such as the Structured Query Language (SQL). One of the primary operations performed with SQL is querying (also referred to herein as retrieving or selecting) data from data structures within a database.

The standard manner of retrieving data from a relational database is by directly querying the data structures in which the data resides. In the case of relational databases, these data structures may be tables or indexes. However, for a variety of reasons including those pertaining to security and optimal system performance, it is not preferred to allow database users to directly access database objects (particularly tables) in order to retrieve data. One alternative to providing direct access to database objects is to utilize user defined table functions (UDTFs).

UDTFs, like database views, are programmatically defined objects that directly reference database tables and appear to users of an RDBMS to be conventional tables. UDTFs can be based on a query or other appropriate logic and return a two-dimensional array structure as though it were a set of rows and columns, thereby allowing RDBMS users to utilize the UDTF as though it were a table. When referenced (or "called"), UDTFs are configured to execute a query that retrieves data from underlying tables and then provide the retrieved data as an array. With a UDTF, it is possible to treat data stored in proprietary file systems, data returned from an API or data generated by a program, as a table. In addition, in certain environments, UDTFs may be used to precompute and provide aggregated representations of base data. They can also be used to precompute joins between two or more tables, with or without aggregations. In many instances, a UDTF optimizes resource usage associated with expensive joins and aggregations for queries involving large volumes of data spread across multiple data structures in a distributed database environment.

Additionally, UDTFs can be used to create an abstraction layer between database users and the actual database tables being selected. Abstraction layers can be used to provide additional security by providing a strictly controlled manner in which data can be retrieved from a database. Further, a UDTF based abstraction layer can be used to provide users with the ability to query data that is sourced from multiple tables belonging to multiple schemas and residing in multiple databases without the user requiring detailed knowledge of the physical layout of the distributed database environment.

In order to maximize the benefit from the functionality described above, distinct UDTFs can be created to represent each table within a distributed database environment. Those skilled in the art will acknowledge, however, that tables exist in wide variety of forms and have vastly different attributes. For instance, in terms of the number of columns, certain tables may be configured with five columns while others may be configured with ninety columns. One problem with using UDTFs is that, as conventionally implemented, each respective UDTF would require a unique query defined to properly retrieve data from the underlying tables. Therefore, during the handling of a query request, for each UDTF referenced, a unique piece of code utilized for coupling the respective UDTF to a corresponding table would have to be invoked to provide the necessary results. This is a resource intensive and inefficient solution for utilizing UDTFs in a distributed database environment.

Another problem is that, as conventionally defined, UDTFs are dependent on the physical structure of the database remaining stable. In other words, the table and column definitions on which a UDTF depends, should not change. Currently, a UDTF typically needs to be re-defined if the underlying objects referenced by UDTF are changed.

Therefore, there is a need for an improved system and method for defining and using UDTFs. There is a further need for the solution to interface with and support applications that are configured to retrieve data from the repository directly.

SUMMARY OF THE INVENTION

The present invention is generally directed to a computer implemented method for accessing data. The method generally includes receiving a first query, which references a first user-defined table function (UDTF), responsive to the received first query, calling the referenced first user-defined table function, calling a second user-defined table function referenced by the first user-defined table function, submitting a second query to query a metadata table to gather attributes of the second UDTF, and submitting a third query to query a table based on the attributes of the second UDTF.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

DETAILED DESCRIPTION OF THE PREFERRED EMBODIMENTS

Figure 1:
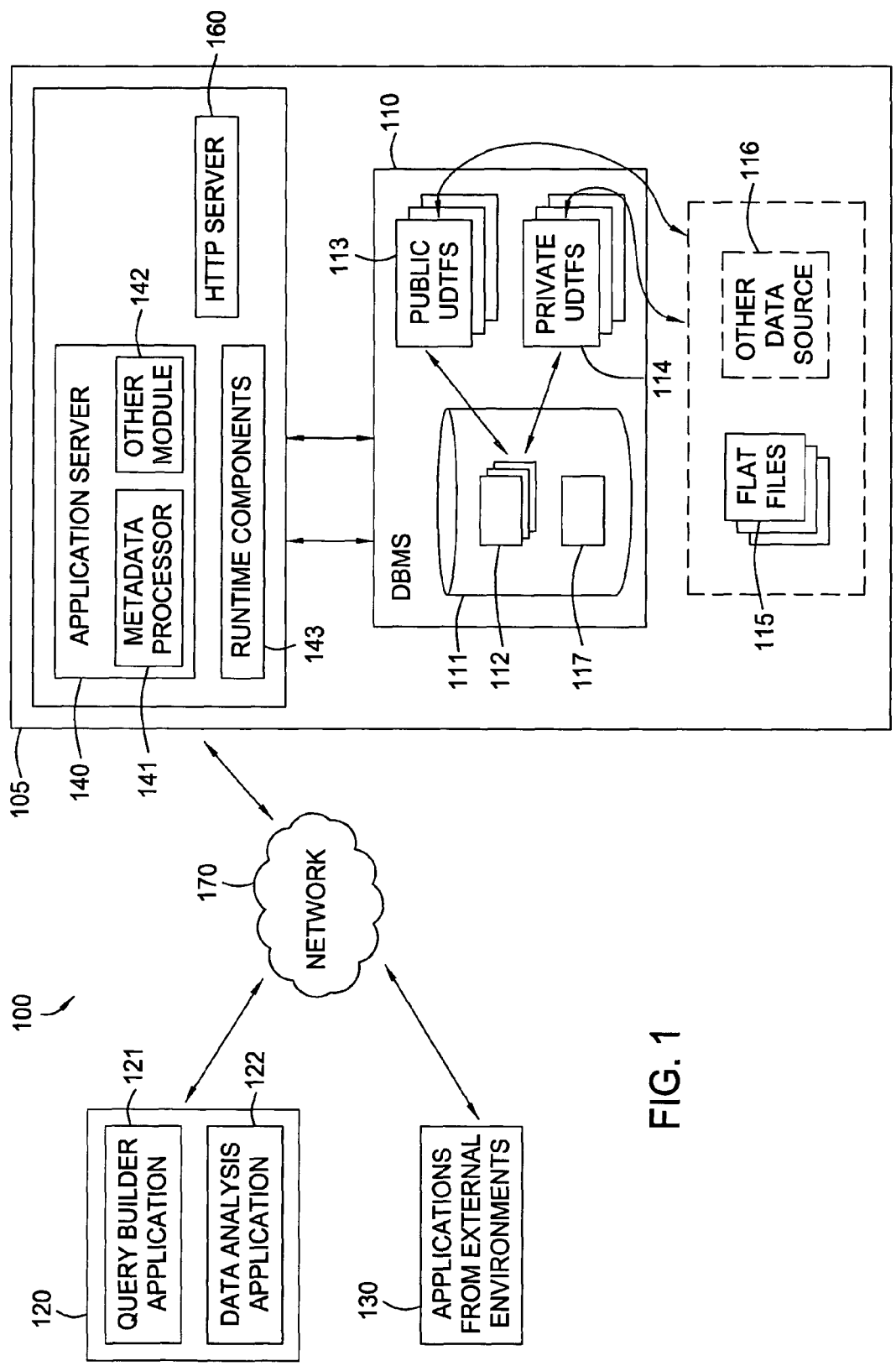
FIG. 1 is a computer system illustratively utilized in accordance with one embodiment of the invention.

The present invention is generally directed to methods, systems and articles of manufacture for accessing data within data repositories. Public UDTFs, private UDTFs and a metadata processor are employed to provide access to data residing in a variety of data repositories, such as relational databases.

In the following, reference is made to embodiments of the invention. The invention is not, however, limited to specific described embodiments. Instead, any combination of the following features and elements, whether related to different embodiments or not, is contemplated to implement and practice the invention. Furthermore, in various embodiments the invention provides numerous advantages over the prior art. Although embodiments of the invention may achieve advantages over other possible solutions or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in the claims. Similarly, reference to "the invention" shall not be construed as a generalization of any inventive subject matter disclosed herein and shall not be considered to be an element or limitation of the appended claims, except where explicitly recited in a specific claim.

As used herein, the term "user" may generally apply to any entity utilizing the data processing system described herein, such as a person (e.g., an individual) interacting with an application program or an application program itself, for example, performing automated tasks. While the following description may refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

As used herein, the term relational database generally refers to a collection of data arranged for ease and speed of search and retrieval. Further, a relational database comprises logical and physical structures managed by a relational database management system (RDBMS).

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown. Likewise, reference to specific programming languages is merely illustrative and not limiting of the invention.

PREFERRED EMBODIMENTS

Referring now to FIG. 1, a relational view of components in one embodiment of a processing environment 100 is illustrated. Generally, the components shown in FIG. 1 may be implemented in any combination of software and/or hardware. The processing environment 100 includes a hardware server 105, an application server 140, one or more application runtime components 143 and a HTTP server 160. All the aforementioned components of the processing environment 100 are linked via a network 170, which may be the Internet 170.

The system 100 also includes a relational database management system (RDBMS) 110 that manages one or more relational databases 111. Data resides in relational tables 112 within the database 111. According to embodiments of the present invention, user defined table functions (UDTFs) are used for providing access to the data. It should be noted that in one embodiment of the present invention, UDTFs are registered within the RDBMS and are managed by the RDBMS. To users (e.g., calling programs) of the RDBMS, UDTFs appear as conventional tables and can be accessed in the same manner in which conventional tables are accessed.

In particular embodiments, UDTFs can be SQL based or Java based. For a SQL based UDTF, any data manipulation logic is defined in SQL, whereas Java based UDTFs have the logic defined in Java. A SQL based UDTF may be based on a query against one or more database tables, while Java based UDTFs may utilize program modules, which may be internal or external to the system 100, for providing required functionality.

In one embodiment, two types of UDTFs are provided: public UDTFs 113 and private UDTFs 114. Public UDTFs 113 are accessible and referenced by all users of the system 100. Private UDTFs 114, on the other hand, are only available to particular users of the system that have the required privileges. According to one embodiment, the management of access rights concerning UDTFs generally follows the methodology for creating and managing access rights for public and private database objects, such as tables and views, in a relational database environment—this methodology is well known by those skilled in the art. It should be noted that, as described herein with respect to a particular embodiment, all UDTFs are registered within the RDBMS and managed by the RDBMS.

As configured in the system according to embodiments of the present invention, public UDTFs 113 are utilized to form an abstraction layer and provide an interface to RDBMS users. They represent the access point to data that is of interest, and are perceived to be tables in which the data is stored. The discussion below will show that public UDTFs 113 are relatively non-complex structures that are defined based on a simple query against private UDTFs 114, similar to the manner in which database views are defined based on a query against underlying tables.

All Private UDTFs 114 are created based on a master UDTF, which is essentially a template. In a particular embodiment, the number of columns the master UDTF and the private UDTFs 114 have is dictated by the particular database management system being utilized. For example, in a particular implementation IBM's DB2® RDBMS is utilized, and this database allows for tables to have up to ninety columns. Accordingly, the master UDTF and all private UDTFs 114 would have ninety columns that are of the string datatype. Unlike public UDTFs 113, private UDTFs 114 are not simply based on a query against other objects in the system 100. Rather, they invoke a Java program, the metadata processor 141, to form a suitable query that will directly access underlying objects and return data to the private UDTF. While one embodiment of the present invention is implemented using Java, those skilled in the art will recognize the methods described herein may be used with other object oriented languages including C++.

The metadata processor is implemented as a Java module that is configured to interface with the private UDTFs. The metadata processor utilizes information about the private UDTF that is stored in the metadata table 117 to construct a suitable query against underlying tables. Upon receiving the query results, the metadata processor transfers the resultant data set to the private UDTF. Operations related to the metadata processor are described in more detail with reference to FIG. 4.

In one aspect, the ability to utilize the same number of columns for all private UDTFs, thereby standardizing all private UDTFs, and the ability to invoke only one piece of code (the metadata processor) to form suitable queries for any private UDTF provides a simple and effective approach to utilizing UDTFs in a distributed database environment. Using this approach, a single piece of code is used to couple all private UDTFs with their corresponding underlying tables.

Referring back to FIG. 1, in addition to relational databases 110, data may also be retrieved from external data sources, such as flat files 115 and any other suitable sources 116. The flat files may be formatted in adherence to various well known formats, such as XML. UDTFs may be used to represent these alternative data sources in the same manner that they represent relational tables. The relationship between the various software components listed above are described in more detail with reference to FIG. 2.

Figure 2:
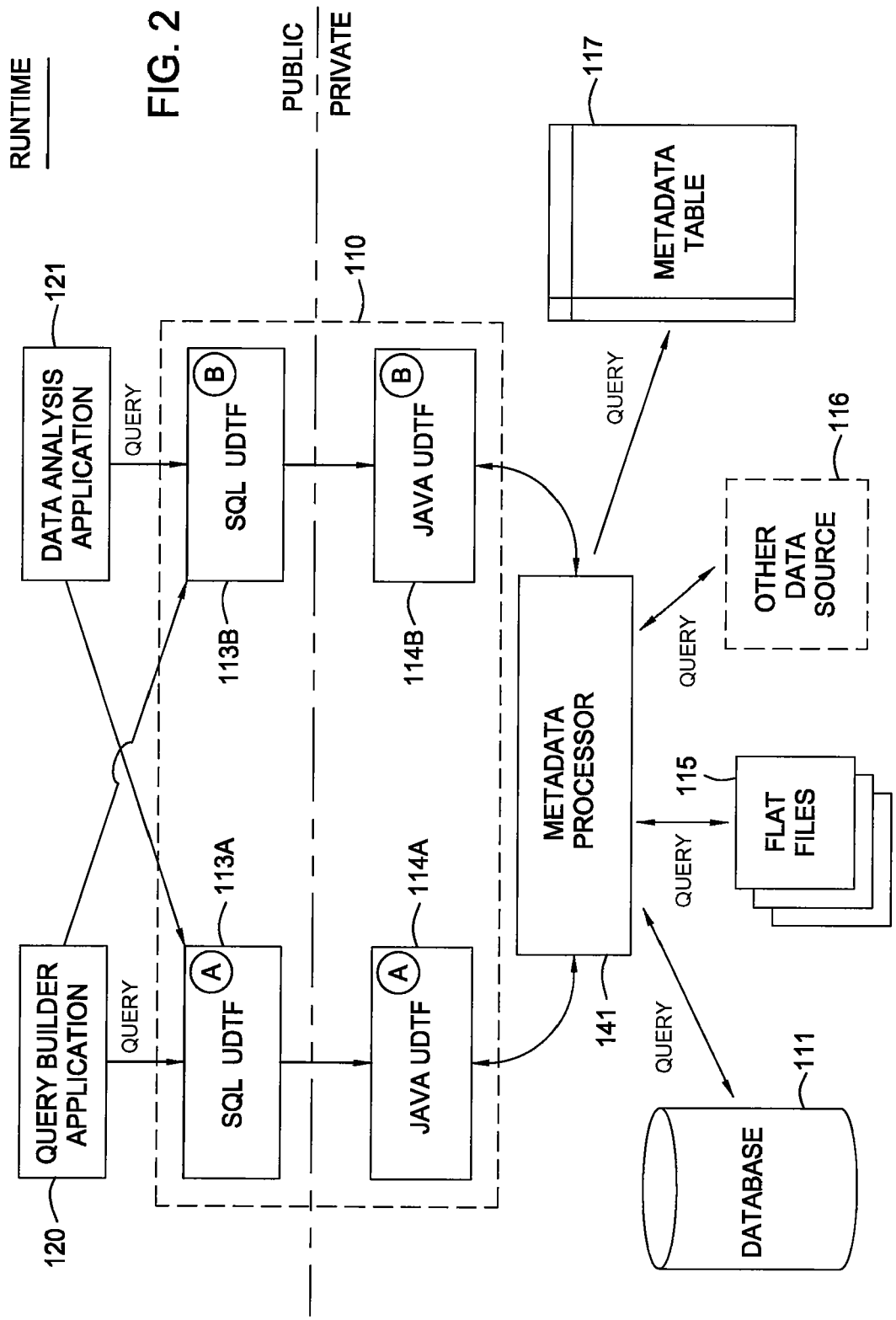
FIG. 2 is a relational view of software components according to one embodiment of the invention.

FIG. 2 is a relational view of software components configured to handle a query request, according to one embodiment of the invention. As shown in FIG. 2, a query builder application 120, data analysis application 121, or any other appropriate application may submit a query request to the DBMS 110. The requesting applications (i.e., RDBMS users) may be referencing particular objects that appear to be conventional tables and they may be oblivious to the fact that the referenced objects are UDTFs. In this manner, the type of underlying objects (e.g., tables, views, other UDTFs, etc.) is abstracted from RDBMS users.

According to embodiments of the current invention, FIG. 2 illustrates that the requests are directed to public UDTFs 113. The public UDTFs 113, in turn, reference private UDTFs 114. In one embodiment, public UDTFs are SQL based and private UDTFs are Java based. The reference by a particular public UDTF 113 to a particular private UDTF is dictated by the definition of the public UDTF 113. For instance, consider the definition of an exemplary public UDTF, shown below in TABLE 1:

TABLE 1

Definition of Exemplary Public UDTF

| 001 | CREATE FUNCTION SCORES_PUBLIC( ) |
| 002 | RETURNS TABLE ( ID INTEGER, |
| 003 | NAME VARCHAR(255), |
| 004 | SCORE INTEGER) |
| 005 | LANGUAGE SQL |
| 006 | RETURN |
| 007 | SELECT INTEGER(SCORES_PRIVATE.ID), |
| 008 | SCORES_PRIVATE.NAME, |
| 009 | INTEGER(SCORES_PRIVATE.SCORE) |
| 010 | FROM SCORES_PRIVATE( ) |

As seen in lines 001-010 of Table 1 above, the UDTF "SCORES_PUBLIC" is being defined (or registered) in the database. As its name implies, this is a public UDTF, and it is configured to reference the "SCORES_PRIVATE" UDTF, as specified in line 010. Accordingly, when referenced by a requesting application for a particular query, the "SCORES_PUBLIC" UDTF relays the request to "SCORES_PRIVATE".

All private UDTFs are created based on a master UDTF, which serves as a template for private UDTFs. One embodiment of the present invention is configured to be implemented in an environment employing the IBM DB2® relational database, although any database environment is contemplated. The DB2® platform supports ninety columns for each table—in other words, a relational table may be ninety columns wide. Accordingly, the master UDTF is configured to accommodate ninety columns. Table 2, shown below, provides an exemplary definition for the "SCORES_PRIVATE" UDTF created using the master UDTF template according to one embodiment of the present invention. Lines 002-091 in Table 2 correspond to the aforementioned ninety columns. It should be noted that only three columns are used (ID, NAME and SCORE), but in order to maintain the standard profile provided by the master UDTF, eighty seven null columns (DONOTUSE1-DONOTUSE87) serve as placeholders.

TABLE 2

Definition of Exemplary Private UDTF

| | |
|---|---|
| 001 | CREATE FUNCTION SCORES_PRIVATE( ) |
| 002 | RETURNS TABLE(ID VARCHAR(5), |
| 003 | NAME VARCHAR(255), |
| 004 | SCORE VARCHAR(5), |
| 005 | DONOTUSE1 VARCHAR(1), |
| 006 | DONOTUSE2 VARCHAR(1), |
| 007 | DONOTUSE3 VARCHAR(1), |
| | ... |
| 091 | DONOTUSE87 VARCHAR(1)) |
| 092 | EXTERNAL NAME 'metadata_processor.TF1' |
| 093 | LANGUAGE JAVA |
| 094 | PARAMETER STYLE DB2GENERAL |
| 095 | NOT DETERMINISTIC |

Line 092 of Table 2 shows that the private UDTF references the metadata processor 141. The metadata processor 141 is what directly queries the database (or the data source). The metadata processor 141 utilizes the metadata table 117 to gather information on the referencing private UDTF. In one embodiment, the metadata table 117 contains a collection of records (one record for each UDTF column) corresponding to each private UDTF. The records contain annotations or metadata that allows the metadata processor 141 to construct a query directly against database tables and return the results back to the calling private UDTF in the required format (e.g., order of columns). For example, as defined in Table 2, the metadata processor 141, as specified in lines 002-004, the SCORES_PRIVATE UDTF expects the metadata processor 141 to return the query results in following columnar order: ID, NAME and SCORE. The metadata table 117 and the metadata processor's 141 use of the table 117 is described in more detail with reference to FIGS. 3 and 4.

Referring still to FIG. 2, in accordance with the discussion above, the metadata processor 114 is shown as the linkage between private UDTFs 114 and the data sources, which are the relational database 111, flat files 115 or any other suitable data source 116. Operations related to handling query requests with the software components described with reference to FIG. 2 are described below with reference to FIG. 3.

Figure 3:
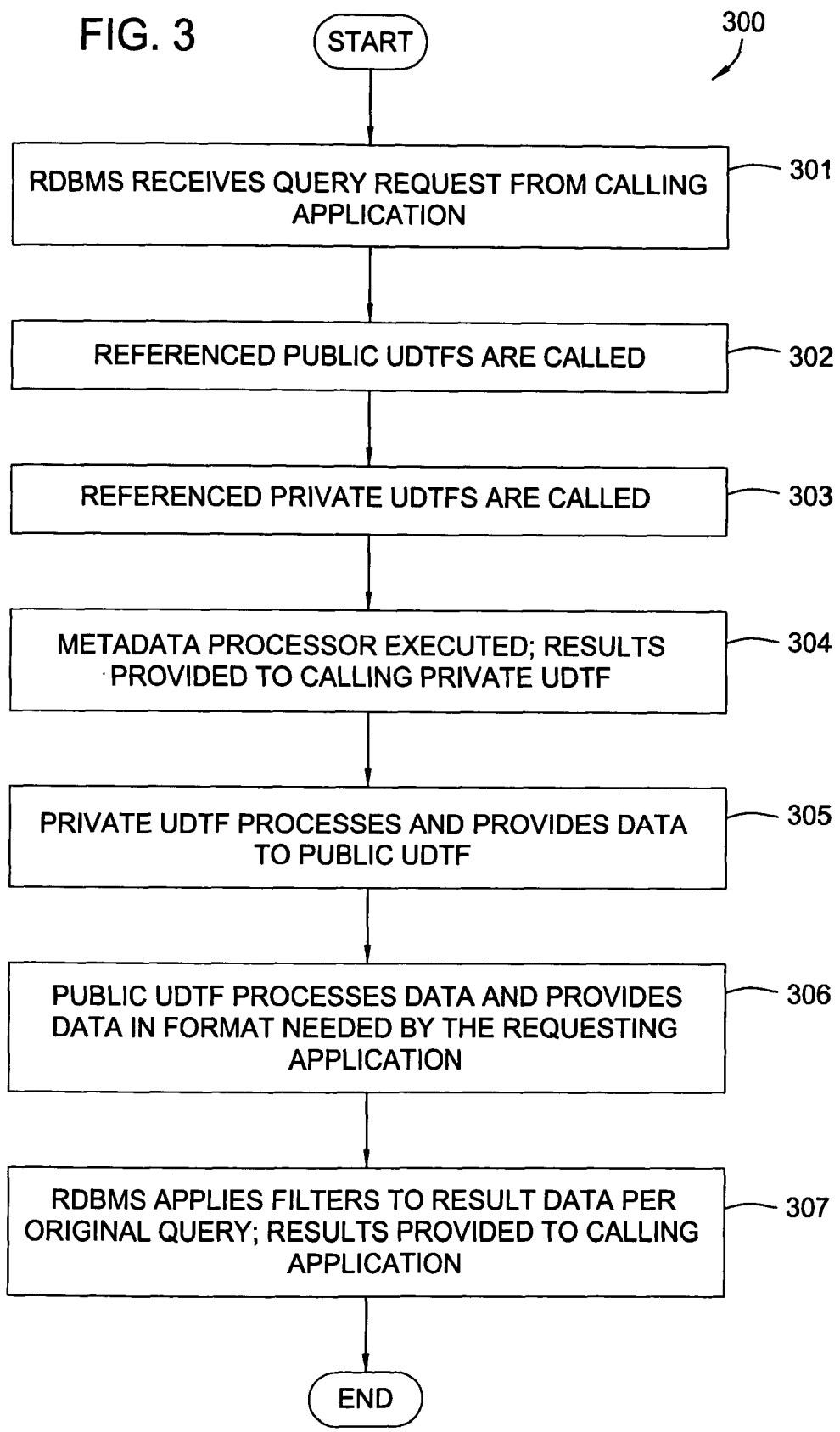
FIG. 3 is a flow chart illustrating exemplary operations for handling query requests, according to one embodiment of the present invention.

FIG. 3 is a flow chart illustrating exemplary operations for handling query requests, according to one embodiment of the present invention. Operations 300 begin at step 301 as the RDBMS receives a query process submitted by an application, such as a query building application 120. It should be noted that according to one embodiment of the present invention, only public UDTFs are accessible to calling applications. Accordingly, the submitted query contains references to one or more public UDTFs instead of conventional tables. The RDBMS parses the submitted query and identifies the referenced public UDTF, which itself (based on its definition) references a corresponding private UDTF. In turn, at step 304 the corresponding private UDTF (referenced by the public UDTF) calls the metadata processor 141, which performs operations described with reference to FIG. 4.

Figure 4:
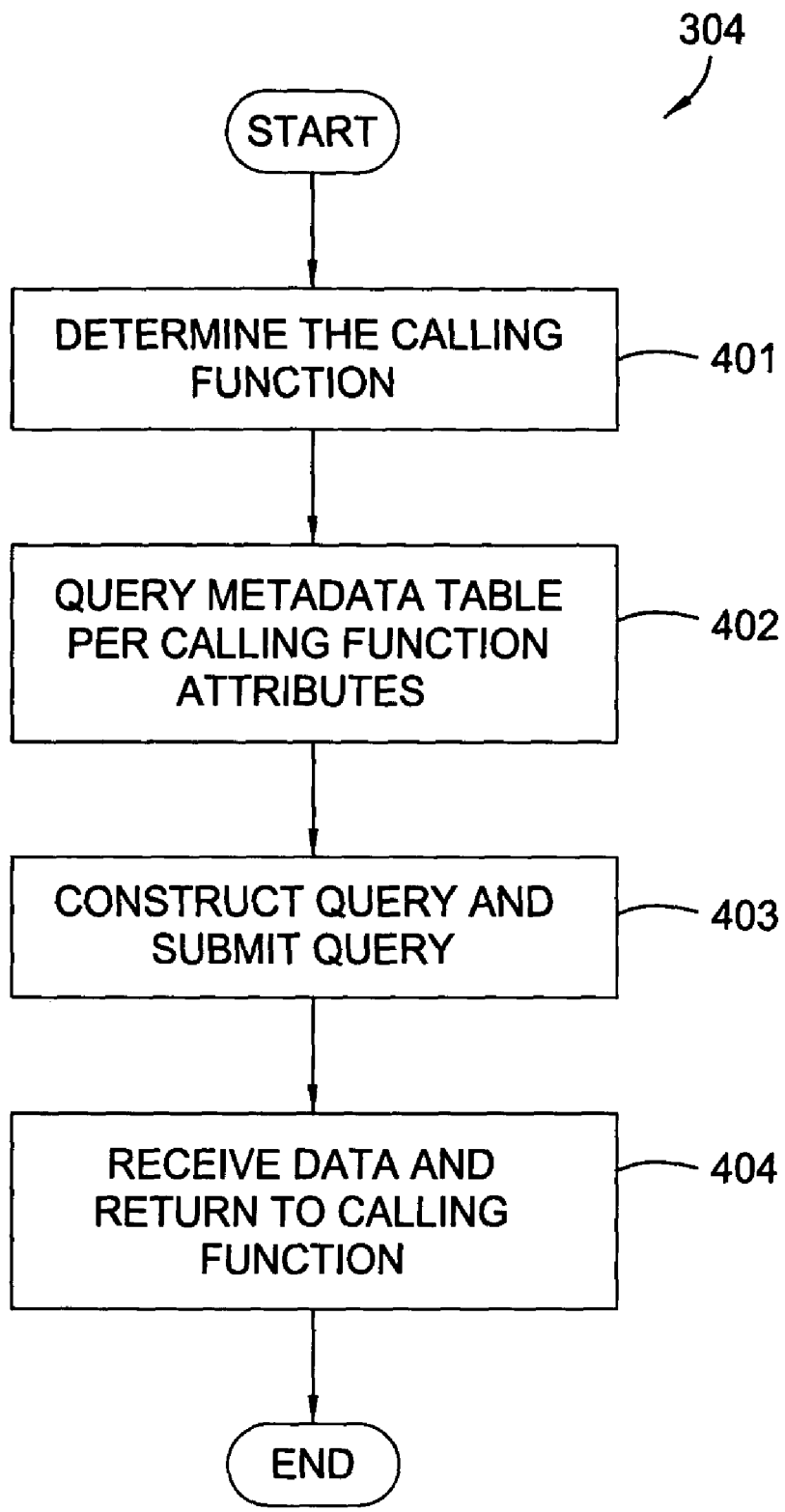
FIG. 4 is a flow chart illustrating exemplary operations performed by the metadata processor for a query request, according to one aspect of the present invention.

FIG. 4 is a flow chart illustrating exemplary operations 304 performed by the metadata processor 141 for a query request, according to one aspect of the present invention. Operations 304 commence at step 401 as the metadata processor 141 determines the calling function. For one embodiment, the calling function is always a private UDTF. Next, at step 402 the metadata processor 141 queries the metadata table 117 for all records pertaining to the calling private UDTF. Based on the metadata gathered from the queried records, the metadata processor 141 constructs an appropriate query directly against database tables at step 403 and submits the query to the RDBMS. At step 404 the metadata processor receives query results from the RDBMS and provides the resultant data set to the calling private UDTF.

Referring back to FIG. 3 now, at step 305 the private UDTF receives and processes the data set provided by the metadata processor 141 and provides the data set to the corresponding public UDTF. The private UDTF processes the data by adding column identifiers, such as column headings, to the data set. At step 306 the public UDTF receives the data set from the private UDTF and processes the data set in preparation for providing the data set to the calling application. For example, the public UDTF processes the data by eliminating extra columns (any of the ninety columns that were not used) and converts the data to the proper datatype.

Finally, at step 307 the RDBMS applies filters to the data, wherein the filters are specified by the original query request (e.g., WHERE clause) and provides the data to the calling application. Stated another way, the RDBMS applies filters to the data set and then provides the filtered data set in response to the original query request received in step 301.

To further describe the operations described with reference to FIGS. 3 and 4, Tables 3-13, shown below, contain an exemplary database table (SCORES), private UDTF, public UDTF and a portion of the metadata table 117 containing records pertaining to the private UDTF. Each of these components correspond to each other and are configured according to embodiments of the present invention to provide calling applications access to data residing in the SCORES table.

TABLE 3

A portion of the SCORES table
Table Name: SCORES

| ID | NAME | SCORE |
|---|---|---|
| 52 | AMY | 10 |
| 53 | BOB | 8 |
| 54 | CAROL | 9 |
| 55 | DAN | 11 |

It can be seen that the SCORES table, shown above, has three columns: ID, NAME and SCORE. Records representing four individuals with ID's ranging from 50 through 55 are shown. Suppose a query is submitted from a calling environment in order to retrieve the data residing in the SCORES table. The discussion below describes the various components of the system and the process which follows operations 300 described earlier. Table 4, shown below contains an example query that is submitted by a calling application (i.e., RDBMS user).

TABLE 4

Query from Calling Application

| | |
|---|---|
| 001 | SELECT * |
| 002 | FROM SCORES |
| 003 | WHERE SCORE > 9 |

According to embodiments of the present invention, rather than allow direct access to the SCORES table, the system is configured to accept external query requests against the SCO- RES_PUBLIC UDTF to provide data that resides in the SCORES table. In fact, RDBMS users do not have visibility or access to the SCORES table. Instead, they have access to SCORES_PUBLIC, which corresponds to the SCORES table. Sample code that is used for registering SCORES_PUBLIC in the RDBMS is provided below in Table 5.

TABLE 5

Exemplary definition for SCORES_PUBLIC UDTF

```
001   CREATE FUNCTION SCORES_PUBLIC( )
002       RETURNS TABLE ( ID INTEGER,
003              NAME VARCHAR(255),
004              SCORE INTEGER)
005       LANGUAGE SQL
006       READS SQLDATA
007       NO EXTERNAL ACTION
008       NOT DETERMINISTIC
009       RETURN
010           SELECT INTEGER(SCORES_PRIVATE.ID),
011       SCORES_PRIVATE.NAME,
012       INTEGER(SCORES_PRIVATE.SCORE)
013   FROM SCORES_PRIVATE( )
```

Lines 002-004 from Table 5 shows that SCORES_PUBLIC is configured to return an array (that appears to calling programs as a table) that has three columns: ID, NAME and SCORE. Lines 010-013 exhibit the SCORES_PUBLIC UDTF referencing the SCORES_PRIVATE UDTF via a query comprising three columns of data. Table 6, shown below, provides code used for registering the SCORES_PRIVATE UDTF.

TABLE 6

Exemplary definition for SCORES_PRIVATE

```
001   CREATE FUNCTION SCORES_PRIVATE( )
002       RETURNS TABLE(ID VARCHAR(5),
003              NAME VARCHAR(255),
004              SCORE VARCHAR(5),
005              DONOTUSE1 VARCHAR(1),
006              DONOTUSE2 VARCHAR(1),
007              DONOTUSE3 VARCHAR(1),
              ...
091              DONOTUSE87 VARCHAR(1))
092           EXTERNAL NAME 'annotation_processor.TF1'
093           LANGUAGE JAVA
```

When referenced, the SCORES_PRIVATE UDTF invokes the metadata processor, as listed on line 092 of Table 6. In turn, the metadata processor queries the metadata table for records describing the private UDTF and then forms and submits a query directly against the underlying tables. Table 7, shown below, presents a portion of the metadata table that contains records pertaining to the SCORES_PRIVATE UDTF.

TABLE 7

Portion of metadata table pertaining to SCORES_PRIVATE

| FUNCTION_NAME | COLUMN_NUMBER | FULL_DB_COL |
|---|---|---|
| SCORES_PRIVATE | 0 | SCORES.ID |
| SCORES_PRIVATE | 1 | SCORES.NAME |
| SCORES_PRIVATE | 2 | SCORES.SCORE |

The above records contain information that the metadata processor relies upon to construct a suitable query for directly retrieving data from the SCORES database table. In this embodiment, the metadata table is configured to have one record for each column that is to be returned. Each record contains the name of the referencing private UDTF, the position in which the column appears in the result set (e.g., the SCORE column appears last, so it has the highest COLUMN_NUMBER). The metadata processor constructs and submits the query against the metadata table, as listed on lines 001-004 shown in Table 8 below.

TABLE 8

Query Against Metadata Table

```
001   SELECT FULL_DB_COL
002       FROM METADATA
003       WHERE FUNCTION_NAME = 'SCORES_PRIVATE'
004       ORDER BY COLUMN_NUMBER.
```

The result set shown below in Table 9 corresponds to the query of Table 8. The metadata processor utilizes the information regarding the SCORES_PRIVATE UDTF in the result set to construct a query. For instance, the result set below shows that three columns of data from the SCORES table are to be retrieved. Specifically, the ID, NAME and SCORE columns are to be retrieved in a specified order.

TABLE 9

Results Corresponding to Query Against Metadata Table

SCORES.ID
SCORES.NAME
SCORES.SCORE

For this example, a WHERE clause is not provided, so all the rows from the SCORES table are retrieved. It should be understood that for purposes of clarity and brevity, the current example is purposely kept simple. More complex implementations of the metadata table are envisioned. For instance, other embodiments may feature a metadata table with additional columns containing special instructions (i.e., instructions that complement the predefined logic used by the metadata processor) for the metadata processor in order to control the query syntax generated by the metadata processor to directly access the database tables. The special instructions may be used to direct the metadata processor to utilize specific joins between certain tables, precompute aggregations, provide additional filters, etc.

Referring back to the current example, the metadata processor utilizes the results shown in Table 9 and constructs a query that directly accesses the SCORES database table; the results associated with the constructed query are shown below in Table 10.

TABLE 10

Results Corresponding to Query Constructed by Metadata processor

| 52 | AMY | 10 | Null | null | ... (repeat 85 more null columns) |
| 53 | BOB | 8 | Null | null | |
| 54 | CAROL | 9 | Null | null | |
| 55 | DAN | 11 | Null | null | |

The results shown in Table 10 are returned by the RDBMS to the metadata processor, and, in turn, the metadata processor relays the results to the SCORES_PRIVATE UDTF. It should be noted that all the data in all the columns is provided in the character datatype. For instance, the SCORE column contains numerical data, but at this stage the SCORE column is still of the character datatype. It should also be noted that the column identifiers are not included. Next, the metadata processor relays the results to the SCORES_PRIVATE UDTF which then processes the results. Table 11, shown below, presents the data set after it has been processed by SCORES_PRIVATE.

TABLE 11

Data Set Processed by SCORES_PRIVATE

| ID | NAME | SCORE | DONOTUSE1 | DONOTUSE2 | DONOTUSE... |
|---|---|---|---|---|---|
| 52 | AMY | 10 | Null | Null | ... (repeat 85 more null columns) |
| 53 | BOB | 8 | Null | Null | |
| 54 | CAROL | 9 | Null | Null | |
| 55 | DAN | 11 | Null | Null | |

As seen in Table 11 above, SCORES_PRIVATE provides the data set with column identifiers and relays the modified data set to SCORES_PUBLIC. As shown below in Table 12, SCORES_PUBLIC removes the eighty seven unused columns.

TABLE 12

Data Set Processed by SCORES_PUBLIC

| ID | NAME | SCORE |
|---|---|---|
| 52 | AMY | 10 |
| 53 | BOB | 8 |
| 54 | CAROL | 9 |
| 55 | DAN | 11 |

In addition to eliminating the unused columns, SCORES_PUBLIC also converts the data within the data set to the proper datatype. Accordingly, the ID and SCORE columns are converted to the numerical datatype. Finally, the RDBMS will apply the WHERE clause from the original query statement (line 003, Table 4) and the final result set shown in Table 13 (below) will be returned to the calling application.

TABLE 13

Final Data Set

| ID | NAME | SCORE |
|---|---|---|
| 52 | AMY | 10 |
| 55 | DAN | 11 |

CONCLUSION

By providing the ability to utilize the same number of columns for all private UDTFs, thereby standardizing all private UDTFs, and providing the ability to invoke only one piece of code (the metadata processor) to form suitable queries for any private UDTF, a simple and effective approach to utilizing UDTFs in a distributed database environment is presented. Using this approach, a single piece of code is used to couple all private UDTFs with their corresponding underlying tables.

As described above, one aspect of one embodiment of the present invention is the contents of the metadata table. Those skilled in the art will acknowledge that for environments with large relational databases, hundreds and perhaps thousands of data structures may need to be represented in the metadata table. Further, a separate row for each column in the respective tables will need to be created in the metadata table. This can be a resource intensive and time consuming effort. To facilitate this effort, embodiments of the present invention are envisioned that provide programmatic tools for analyzing UDTFs and their columns and then automatically populating the metadata table accordingly.

While the examples above have featured queries that access data from tables in only one schema, those skilled in the art will appreciate that embodiments of the present invention can support multiple schemas residing in different databases in a distributed database environment. In fact, implementing the methods described herein is even more advantageous in an environment employing numerous schemas in various databases, with each schema containing numerous tables with large amounts of data.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A computer implemented method, comprising:
    providing a calling application that submits a first query;
    receiving the first query, which references a first user-defined table function (UDTF);
    responsive to the received first query, calling the referenced first UDTF;
    calling a second user-defined table function referenced by the first UDTF; and
    calling a metadata processor referenced by the second UDTF for performing operations related to providing data to the second UDTF, wherein the operations comprise:
        submitting a second query to query a metadata table to gather attributes of the second UDTF;
        receiving query results which correspond to the second query;
        using query results which correspond to the second query, forming a third query against a table;
        submitting the third query and receiving results which correspond to the third query; and
        providing query results which correspond to the third query to the second UDTF.

2. The computer implemented method of claim 1, further comprising the second UDTF receiving query results which correspond to the third query, and providing the query results which correspond to the third query to the first UDTF.

3. The computer implemented method of claim 2, further comprising the first UDTF receiving query results from the second UDTF and processing the query results which correspond to the third query and providing processed query results to the calling application.

4. The computer implemented method of claim 3, wherein processing the query results comprises:
converting data within the query results corresponding to the third query to another datatype; and
providing column headings.

5. The computer implemented method of claim 1, wherein the first UDTF is defined using structured query language (SQL).

6. The computer implemented method of claim 1, wherein the second UDTF is defined using Java.

* * * * *